Oct. 18, 1955      G. K. STEBBINS      2,720,756
HEAT PUMP, INCLUDING FIXED FLOW CONTROL MEANS
Filed Dec. 29, 1954
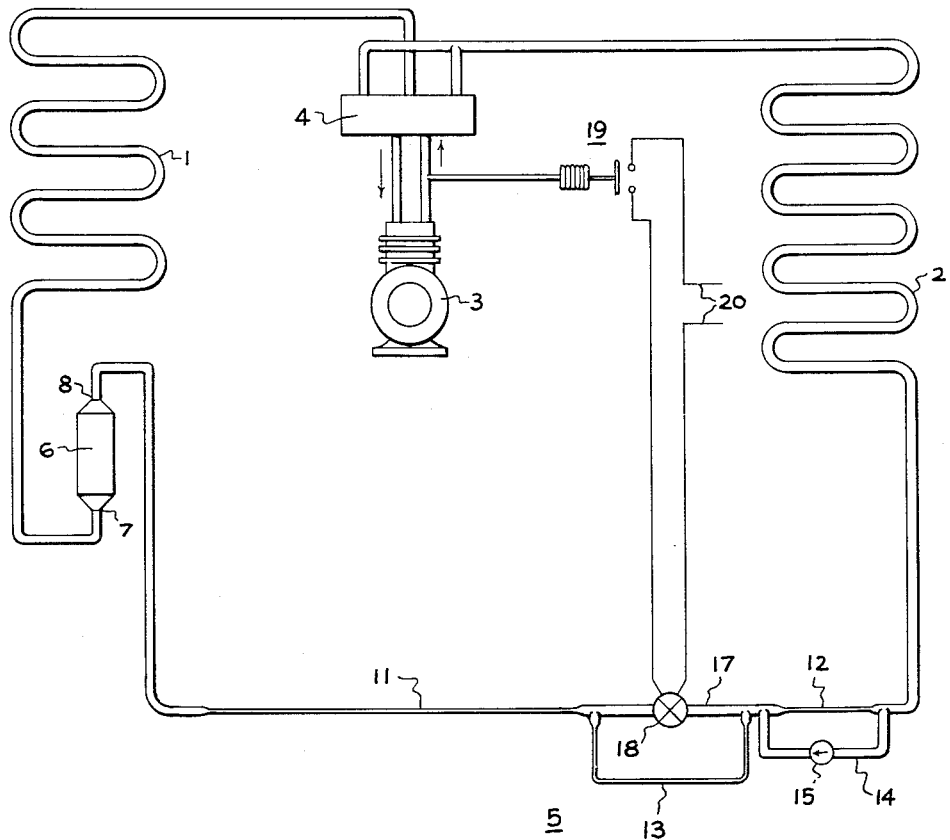
INVENTOR.
GORDON K. STEBBINS
BY *Sheridan & Biggs*
HIS ATTORNEY United States Patent Office 2,720,756
Patented Oct. 18, 1955

2,720,756

HEAT PUMP, INCLUDING FIXED FLOW CONTROL MEANS

Gordon K. Stebbins, Clifton, N. J., assignor to General Electric Company, a corporation of New York Application December 29, 1954, Serial No. 478,465

3 Claims. (Cl. 62—3)

The present invention relates to heat pumps and more particularly to a heat pump comprising fixed flow control means adapted to control the flow of refrigerant through the reversible refrigerant circuit under both normal and overload conditions.

A heat pump employed for cooling an entire dwelling or other structure in the summer and the heating thereof during the colder months essentially comprises a reversible refrigerant circuit including an indoor heat exchanger, an outdoor heat exchanger, compressor means for effecting the flow of refrigerant through the circuit in either direction and means for controlling the flow of refrigerant from one heat exchanger to the other and for effecting and maintaining a pressure differential between the two sides of the refrigerant circuit.

Until quite recently, conventional expansion valves have been used for controlling flow of refrigerant through the refrigerant circuits of the larger heat pumps employed for example for conditioning an entire dwelling. The use of fixed flow restrictor means such as a capillary tube as flow control means has been restricted to the smaller size heat pumps such as the window air conditioners. The principal reason for this has been that a capillary tube has only one ideal operating condition and while some loss of efficiency can be tolerated in the smaller size heat pump units employed for example for cooling a room in the summer such loss of efficiency cannot be tolerated in the larger size heat pumps employed for year-round air conditioning purposes. In other words, a refrigerating circuit including a capillary tube as the flow control means can be expected to operate with maximum efficiency only within a relatively narrow range of temperatures and pressures for which the circuit was designed.

Furthermore, the flow of refrigerant through a fixed tubular flow restrictor means increases with the pressure difference across the tubular restrictor which is a disadvantage under certain operating conditions as, for example, when the outdoor temperature is excessively high and a reduction in the average flow rate of the refrigerant is desirable and necessary in order to protect the heat pump unit, primarily the compressor motor, from overload.

It is a primary object of the present invention to provide a heat pump including a reversible refrigerant circuit comprising a fixed tubular flow restricting means and simple and effective means for maintaining an efficient flow of refrigerant therethrough under different conditions of operation of the heat pump.

A further object of the invention is to provide a heat pump comprising a reversible refrigerant circuit including a motor-driven compressor, a fixed tubular flow restricting means and means for controlling and limiting the maximum load on the compressor motor.

Further objects of the invention will become apparent as the following description proceeds and the features of novelty which characterize the invention will be pointed out with particularity in the claims annexed to and forming a part of this specification.

In carrying out the objects of the present invention there is provided a heat pump comprising an indoor heat exchanger and an outdoor heat exchanger connected in a closed refrigerant circuit and a motor-driven compressor unit including valve means for effecting flow of refrigerant through the circuit in either direction so that the circuit can be operated with either of the heat exchangers as the evaporator and the other as the condenser. To control the flow of refrigerant from one heat exchanger to the other during operation of the heat pump on either the heating cycle or the cooling cycle, there is employed a fixed tubular flow restricting means comprising a plurality of series-connected capillary tubes or tube sections and means for bypassing one or more of the tubes or tube sections for the purpose of maintaining the desired operation of the heat pump under both normal and overload operating conditions. The fixed flow restricting means of the present invention is so designed as to maintain optimum operating conditions of the heat pump system on either the cooling cycle or the heating cycle and to decrease the flow of refrigerant through flow restricting means under abnormally high load conditions on the unit.

For a better understanding of the invention, reference may be had to the accompanying drawing in which the single figure represents diagrammatically a heat pump embodying the present invention.

Referring now to the drawing, the heat pump illustrated therein comprises an indoor heat exchanger 1 and an outdoor heat exchanger 2 which ordinarily is somewhat larger, that is, has a greater radiating surface, than the indoor heat exchanger 1. Means for conducting refrigerant from one of the two heat exchangers to the other includes a motor-driven compressor 3 and a reversing valve 4. A pressure differential between the two heat exchangers is maintained by the fixed flow restricting means 5 forming an essential element of the present invention. A container 6 having its lower end 7 connected to the indoor heat exchanger 1 and its upper end 8 connected to the flow restricting means 5 provides means for decreasing the effective refrigerant charge in the circuit when the heat pump is changed over from operation on the heating cycle in which the indoor heat exchanger 1 functions as a condenser to the cooling cycle in which the indoor heat exchanger 1 functions as an evaporator. This container 6 and its arrangement in combination with the remaining elements of the heat pump is more completely described and claimed in the copending application Serial No. 478,429 filed concurrently herewith in the names of Donald W. Lynch and George Pinter and assigned to the same assignee as the present invention.

The flow restricting means 5 of the present invention comprises three capillary tube sections in series connection. One of these sections indicated by the numeral 11 is the sole means for restricting the flow of refrigerant from the high to the low pressure portions of the system during operation of the heat pump on both the heating and the cooling cycles while a second capillary tube section 12 forms part of flow restricting means only during operation of the heat pump on the heating cycle. A third capillary tube section 13 adds its restrictive effect to the flow of the refrigerant only when the system is operating under abnormally high load conditions.

In order to prevent the capillary tube section 12 from exerting its restrictive effect during operation of the refrigerant circuit on the cooling cycle, there is provided a bypass line 14 around the section 12. This line includes a check valve 15 which permits flow of refrigerant through the bypass line from the outdoor heat exchanger 2 to the indoor heat exchanger 1 but closes the bypass line to direct the flow through section 12 when the flow of refrigerant is in the reverse direction, that is from the indoor heat exchanger 1 to the outdoor heat exchanger 2. A second bypass line 17 bypassing the capillary tube section 13 includes a valve 18 which is illustrated as being a solenoid valve and is normally held in a valve open position. The operation of valve 18 is under the control of a bellows switch 19. This switch is designed to close in response to an increased head pressure in the refrigerant circuit and thereby place the valve 18 across the supply line 20 to actuate the valve to the closed position.

During operation of the heat pump on the cooling cycle compressed refrigerant from the motor-driven compressor means 3 is directed by means of the reversing valve 4 to the outdoor coil 2 wherein the refrigerant is condensed and the heat liberated during condensation is given up to the outdoor air. During normal operation of the system the condensed refrigerant is then carried through the by-pass line 17 which includes the normally open valve 18 and the bypass line 14 which is controlled by the check valve 15 so that the only restriction to the flow of refrigerant from the outdoor coil to the indoor heat exchanger is the capillary tube section 11. The low pressure refrigerant introduced into the container 6 which has just passed through the throttling device 11 contains a certain portion of gaseous refrigerant so that the refrigerant reaching the container 6 is in the form of a mixture of liquid and gaseous refrigerant. This low density mixture passes through the container 6 and into the indoor heat exchanger 1 where the liquid refrigerant is evaporated by absorption of heat from the air surrounding the indoor heat exchanger.

The capillary tube section 11 is so proportioned as to diameter and length that its restrictive effect is such as to provide optimum operating conditions for the heat pump for normal cooling loads.

When the reversing valve 4 is set to operate the heat pump on the heating cycle the compressed refrigerant from the compressor 3 flows first to the indoor heat exchanger 1 wherein it is condensed and the heat liberated is absorbed by the air being conditioned. The condensed refrigerant from the indoor heat exchanger then collects in the container 6 until this container is filled with liquid refrigerant. As the container 6 remains full of liquid refrigerant during the remaining time that the heat pump is operating on the heating cycle, a quantity of refrigerant equal to the capacity of container 6 is effectively removed from the system during heating cycle operation in order to reduce the effective quantity of refrigerant to that required for most efficient operation of the system on the heating cycle. From the container 6 the liquid refrigerant flows through both the capillary tube section 11 and capillary tube section 12, flow through the bypass line 14 being prevented by check valve 15. The low pressure refrigerant entering the outdoor heat exchanger 2 from the flow restricting means 5 is evaporated in the exchanger 2 and the gaseous refrigerant returned to the compressor 3. The capillary tube section 12 is selected so that its restrictive effect plus the restrictive effect of the series-connected capillary tube section 11 will provide for most efficient operation of the system on the heating cycle under normal operating conditions.

The design of the capillary tube sections 11 and 12, and the arrangement for bypassing section 12 when the circuit is operated on the cooling cycle provide means for obtaining the most efficient refrigerant flow rates for handling the normal loads on the system when operating on either the cooling or the heating cycle.

However, under certain conditions, the average or normal refrigerant flow rate may overload the heat pump, primarily the compressor motor. For example, when the outdoor temperature becomes excessively high during operation of the system on the cooling cycle it is desirable to reduce the flow of refrigerant to the evaporator as otherwise the compressor motor would have to carry a heavier load than during normal summer operating conditions. To reduce the refrigerant flow rate and thereby protect the compressor motor from becoming excessively overloaded, the bellows actuated switch 19 which operates in response to an increase in compressor head pressure is arranged to close at a predetermined increased head pressure and thereby close the valve 18 in the bypass line 17. With the valve 18 closed, the restrictive effect of the flow restricting means 5 is increased by the addition of the capillary tube section 13. The result is a reduction in flow of the refrigerant to the indoor heat exchanger 1 and therefore to the compressor 3 until such time as the compressor head pressure is again reduced sufficiently to open the bellows operated switch 19 and thereby open valve 18 in the bypass line 17. While the valve 18 in the bypass line 17 has been illustrated as being under control of a sensing switch 19 which is responsive to compressor head pressure, it is to be understood that any suitable condition of operation of the heat pump or change in condition of operation of the heat pump may be employed to sense the overload condition and control the operation of valve 18. For example, the control condition may be motor power, i. e. watts, motor amps. or motor temperature or compressor temperature instead of compressor head pressure.

From the foregoing it is apparent that there has been provided a simple arrangement for controlling the operation of a heat pump including a fixed flow restricting means during normal operation on both the heating and the cooling cycle and also under abnormal operating conditions. Although specific arrangements have been illustrated and described, various modifications will be apparent to those skilled in the art and it is therefore intended by the appended claims to cover all modifications within the spirit and scope of the present invention.

What I claim as new and desire to secure by Letters Patent of the United States is:

1. A heat pump comprising an indoor heat exchanger and an outdoor heat exchanger connected in a closed refrigerant circuit, motor-driven compressor and valve means in said circuit for effecting flow of refrigerant through said circuit in either direction whereby said pump may be operated on a cooling cycle with the indoor coil functioning as an evaporator or on a heating cycle with the indoor coil functioning as a condenser, and a tubular flow restricting means in said circuit controlling the flow of refrigerant from either of said heat exchangers to the other heat exchanger, said flow restricting means comprising a plurality of series-connected capillary tube sections including first and second sections arranged to conduct refrigerant on both cycles of operation of said pump, a check valve controlled by-pass conduit by-passing said second capillary tube section during operation of said pump on the cooling cycle, a second by-pass line by-passing a third capillary tube section and including a normally open valve means, and means for closing said valve means in response to a condition of operation of said pump for closing said normally open valve means to direct the flow of refrigerant through said third capillary tube section to decrease the flow of refrigerant through said flow restricting means.

2. A heat pump comprising an indoor heat exchanger and an outdoor heat exchanger connected in a closed refrigerant circuit, motor-driven compressor and valve means in said circuit for effecting flow of refrigerant through said circuit in either direction whereby said pump may be operated on a cooling cycle with the indoor coil functioning as an evaporator or on a heating cycle with the indoor coil functioning as a condenser, and a flow restricting means in said circuit controlling the flow of refrigerant from either of said heat exchangers to the other heat exchanger, said flow restricting means comprising a plurality of series-connected capillary tube sections, a conduit by-passing one of said sections including normally open valve means and means for closing said valve means in response to a condition of operation of said pump to decrease the flow of refrigerant through said flow restricting means.

3. A heat pump comprising an indoor heat exchanger and an outdoor heat exchanger connected in a closed refrigerant circuit, motor-driven compressor and valve means in said circuit for effecting flow of refrigerant through said circuit in either direction whereby said pump may be operated on a cooling cycle with the indoor coil functioning as an evaporator or on a heating cycle with the indoor coil functioning as a condenser and a flow restricting means in said circuit controlling the flow of refrigerant from either of said heat exchangers to the other heat exchanger, said flow restricting means comprising a plurality of capillary tube sections, means including a check-valve for by-passing one of said sections during operation of said pump on the cooling cycle, a conduit including a normally open valve means for by-passing another of said sections during normal operation of said pump on either cycle and means for closing said valve means in response to an increased load on said compressor motor to decrease the flow of refrigerant through said flow restricting means.

Reference Cited in the file of this patent

UNITED STATES PATENTS

| | | |
|---|---|---|
| Re. 22,100 | Brace et al. | May 26, 1942 |
| 1,935,281 | Reed | Nov. 14, 1933 |
| 2,453,131 | Hubbard | Nov. 9, 1948 |
| 2,675,683 | McGrath et al. | Apr. 20, 1954 |